(12) United States Patent
Shiraishi et al.

(10) Patent No.: US 10,109,312 B2
(45) Date of Patent: Oct. 23, 2018

(54) MOTOR INCLUDING A YOKE WITH AN INCREASED THICKNESS PORTION AND A DECREASED THICKNESS PORTION AND DISK DRIVE APPARATUS INCLUDING THE MOTOR

(71) Applicant: Nidec Corporation, Kyoto (JP)

(72) Inventors: Masahiro Shiraishi, Kyoto (JP); Katsuya Takahashi, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 0 days.

(21) Appl. No.: 15/633,843

(22) Filed: Jun. 27, 2017

(65) Prior Publication Data

US 2018/0108377 A1    Apr. 19, 2018

(30) Foreign Application Priority Data

Oct. 18, 2016  (JP) ................ 2016-204339

(51) Int. Cl.
| | | |
|---|---|---|
| *G11B 19/20* | (2006.01) | |
| *H02K 1/27* | (2006.01) | |
| *H02K 1/02* | (2006.01) | |
| *H02K 7/14* | (2006.01) | |
| *H02K 1/30* | (2006.01) | |

(52) U.S. Cl.
CPC ...... *G11B 19/2045* (2013.01); *G11B 19/2009* (2013.01); *H02K 1/02* (2013.01); *H02K 1/27* (2013.01); *H02K 1/272* (2013.01); *H02K 7/14* (2013.01); *H02K 1/2786* (2013.01); *H02K 1/30* (2013.01)

(58) Field of Classification Search
CPC ... G11B 19/2009; G11B 19/2045; H02K 1/27
USPC ........................................... 360/98.07, 99.08
See application file for complete search history.

(56) References Cited

U.S. PATENT DOCUMENTS

| | | | | |
|---|---|---|---|---|
| 5,216,557 | A * | 6/1993 | Elsaesser ............. | G11B 17/038 360/99.08 |
| 6,271,988 | B1 * | 8/2001 | Papst ..................... | F16C 35/04 360/98.07 |
| 8,120,217 | B2 | 2/2012 | Yawata et al. | |
| 8,451,557 | B2 * | 5/2013 | Nagai ................ | G11B 19/2018 360/97.19 |
| 8,553,354 | B2 * | 10/2013 | Kitamura ........... | G11B 19/2036 310/90 |
| 8,693,137 | B2 * | 4/2014 | Kodama ............. | G11B 5/6005 310/90 |

(Continued)

*Primary Examiner* — Jefferson Evans
(74) *Attorney, Agent, or Firm* — Keating & Bennett, LLP

(57) ABSTRACT

A motor that rotates an annular member includes a stationary portion including a stator, and a rotating portion arranged to be rotatable about a central axis extending in a vertical direction. The rotating portion includes a hub extending in an annular shape around the central axis; a magnet including a pole surface arranged radially opposite to the stator; and a yoke to which the magnet is fixed. The yoke includes a yoke increased thickness portion arranged radially outside of the magnet; and a yoke decreased thickness portion with a radial thickness smaller than that of the yoke increased thickness portion, and arranged axially above the yoke increased thickness portion. The yoke decreased thickness portion is fixed to the hub annular portion through press fitting.

17 Claims, 9 Drawing Sheets

(56) References Cited

U.S. PATENT DOCUMENTS

| | | | | |
|---|---|---|---|---|
| 8,743,505 B2 * | 6/2014 | Yamada | .............. | F16C 32/0659 |
| | | | | 310/90 |
| 9,082,448 B2 * | 7/2015 | Kodama | ............ | G11B 19/2036 |
| 2005/0116564 A1 * | 6/2005 | Tokunaga | .............. | F16C 17/107 |
| | | | | 310/90 |
| 2007/0058291 A1 * | 3/2007 | Shirai | .................. | G11B 17/038 |
| | | | | 360/99.08 |
| 2007/0236091 A1 * | 10/2007 | Fukushima | .......... | G11B 17/028 |
| | | | | 310/90 |
| 2010/0226601 A1 * | 9/2010 | Inazuka | ................ | F16C 17/107 |
| | | | | 384/107 |
| 2011/0116191 A1 * | 5/2011 | Maeda | ............... | G11B 17/0287 |
| | | | | 360/224 |
| 2011/0279925 A1 * | 11/2011 | Watanabe | ............ | G11B 25/043 |
| | | | | 360/99.08 |
| 2013/0050873 A1 * | 2/2013 | Abe | ........................ | H02K 1/146 |
| | | | | 360/99.08 |
| 2013/0194907 A1 * | 8/2013 | Kodama | ............ | G11B 19/2009 |
| | | | | 369/264 |
| 2014/0334036 A1 * | 11/2014 | Nishino | ............. | G11B 19/2036 |
| | | | | 360/99.12 |
| 2015/0187374 A1 * | 7/2015 | Aoki | .................. | G11B 19/2045 |
| | | | | 29/603.03 |
| 2017/0353068 A1 * | 12/2017 | Miyake | ................ | H02K 1/2786 |

* cited by examiner

MOTOR INCLUDING A YOKE WITH AN INCREASED THICKNESS PORTION AND A DECREASED THICKNESS PORTION AND DISK DRIVE APPARATUS INCLUDING THE MOTOR

CROSS REFERENCE TO RELATED APPLICATIONS

This application claims the benefit of priority to Japanese Patent Application No. 2016-204339 filed on Oct. 18, 2016. The entire contents of this application are hereby incorporated herein by reference.

BACKGROUND OF THE INVENTION

1. Field of the Invention

The present invention relates to a motor and a disk drive apparatus.

2. Description of the Related Art

Hard disk apparatuses and optical disk apparatuses typically have motors arranged to rotate disks installed therein. Such a known motor is described in, for example, JP-A 2009-189157. In this known motor, a recording disk is held by a rotor hub, which is fixed to an upper end portion of a shaft, and is arranged to rotate together with the shaft. A substantially cylindrical yoke is fixed to an outer circumferential edge of a lower portion of the rotor hub, and a field magnet is fixed to an inner circumferential surface of the yoke.

In the motor described in JP-A 2009-189157, the yoke is fixed to a portion of the rotor hub which has a small radial thickness when the yoke is fixed to the outer circumferential edge of the lower portion of the rotor hub. In this case, the rotor hub as a whole may be deformed due to the above fixing. A deformation of the rotor hub makes it difficult to precisely position the recording disk or the like on the rotor hub, which may lead to a failure to allow the recording disk or the like to stably rotate.

SUMMARY OF THE INVENTION

A motor according to a preferred embodiment of the present invention is arranged to rotate an annular member, and includes a stationary portion including a stator, and a rotating portion arranged to be rotatable about a central axis extending in a vertical direction. The rotating portion includes a hub arranged to extend in an annular shape around the central axis; a magnet including a pole surface arranged radially opposite to the stator; and a yoke to which the magnet is fixed. The hub includes a hub annular portion in a shape of a circular ring and arranged above the stator, and a flange surface on which the annular member is arranged. The yoke includes a yoke increased thickness portion arranged radially outside of the magnet; and a yoke decreased thickness portion arranged to have a radial thickness smaller than that of the yoke increased thickness portion, and arranged axially above the yoke increased thickness portion. The yoke decreased thickness portion is fixed to the hub annular portion through press fitting.

According to the above preferred embodiment of the present invention, the yoke decreased thickness portion, which has a relatively small radial thickness in the yoke, is fixed to an outer circumferential surface of the hub through press fitting. Thus, stress applied when the yoke is fixed to the hub concentrates on the yoke, and does not easily affect the flange surface of the hub. This contributes to minimizing deformation of the flange surface, and to stable rotation of the annular member, which may include a disk, supported by the flange surface.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Hereinafter, preferred embodiments of the present invention will be described with reference to the accompanying drawings. It is assumed herein that a direction parallel to a central axis of a motor is referred to by the term "axial direction", "axial", or "axially", that directions perpendicular to the central axis of the motor are each referred to by the term "radial direction", "radial", or "radially", and that a direction along a circular arc centered on the central axis of the motor is referred to by the term "circumferential direction", "circumferential", or "circumferentially". It is also assumed herein that an axial direction is a vertical direction, and that a side on which a hub, on which an annular member including a disk is arranged, is arranged with respect to a stator is defined as an upper side. The shape of each member or portion and relative positions of different members or portions will be described based on the above assumptions. It should be noted, however, that the above definitions of the vertical direction and the upper and lower sides are not meant to restrict in any way the orientation of a motor or a disk drive apparatus according to any preferred embodiment of the present invention when in use. Also note that the term "parallel" as used herein includes both "parallel" and "substantially parallel". Also note that the term "perpendicular" as used herein includes both "perpendicular" and "substantially perpendicular".

1. First Preferred Embodiment

Figure 1:
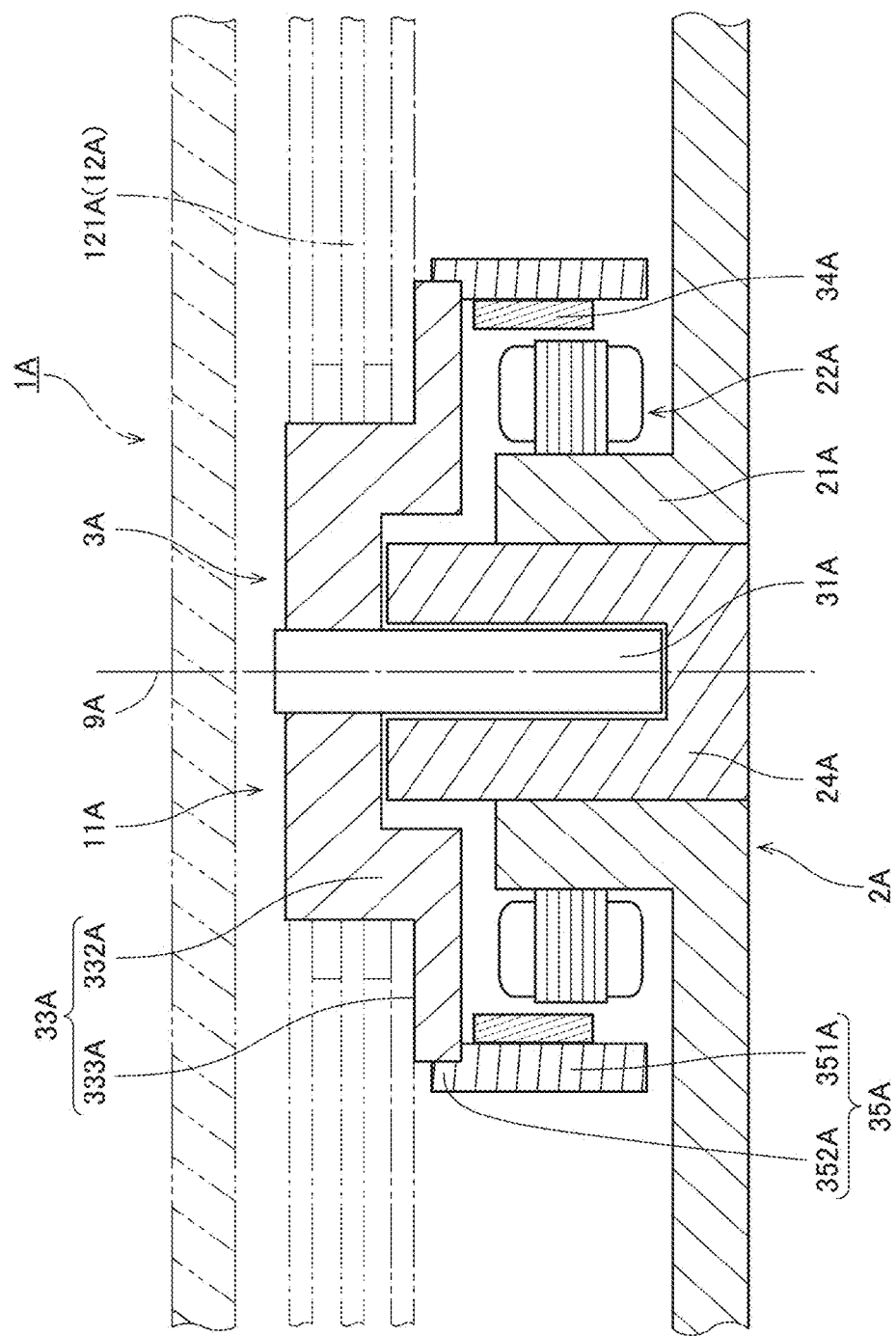
FIG. 1 is a vertical sectional view of a motor according to a first preferred embodiment of the present invention.

FIG. 1 is a vertical sectional view of a motor 11A according to a first preferred embodiment of the present invention. This motor 11A is used in a disk drive apparatus 1A, and is arranged to rotate disks 121A, each of which is an annular member 12A. Referring to FIG. 1, the motor 11A includes a rotating portion 3A and a stationary portion 2A including a stator 22A. The rotating portion 3A is supported to be rotatable about a central axis 9A extending in the vertical direction with respect to the stationary portion 2A.

The stationary portion 2A includes a bearing 24A and a base portion 21A. The bearing 24A is arranged to rotatably support a shaft 31A. The base portion 21A is arranged to hold the stator 22A.

The rotating portion 3A includes a hub 33A, a magnet 34A, and a yoke 35A. The hub 33A is arranged axially above the base portion 21A, and is arranged to extend in an annular shape around the central axis 9A. The magnet 34A is cylindrical or substantially cylindrical, and includes a pole surface arranged radially opposite to the stator 22A. The magnet 34A is fixed to the yoke 35A.

The hub 33A includes a hub annular portion 332A in the shape of a circular ring, and a flange surface 333A. The hub annular portion 332A is arranged above the stator 22A. The flange surface 333A is an upper surface of a lower portion of the hub annular portion 332A, the lower portion extending radially. The disks 121A are arranged on the flange surface 333A.

In addition, the yoke 35A includes a yoke increased thickness portion 351A, and a yoke decreased thickness portion 352A arranged to have a radial thickness smaller than that of the yoke increased thickness portion 351A. The yoke increased thickness portion 351A is arranged radially outside of the magnet 34A. The yoke decreased thickness portion 352A is arranged axially above the yoke increased thickness portion 351A.

Referring to FIG. 1, the yoke decreased thickness portion 352A is fixed to the hub annular portion 332A through press fitting. Since the yoke decreased thickness portion 352A, which has a relatively small radial thickness in the yoke 35A, is fixed to the hub annular portion 332A, deformation due to stress applied at the time of the fixing concentrates on the yoke 35A, and does not easily affect the flange surface 333A of the hub 33A. This contributes to minimizing deformation of the flange surface 333A. This in turn leads to stable rotation of the disks 121A. Moreover, the likelihood that an error in reading from any disk 121A will occur due to a deformation of the hub 33A is reduced.

2. Second Preferred Embodiment 2-1. Structure of Disk Drive Apparatus

Figure 2:
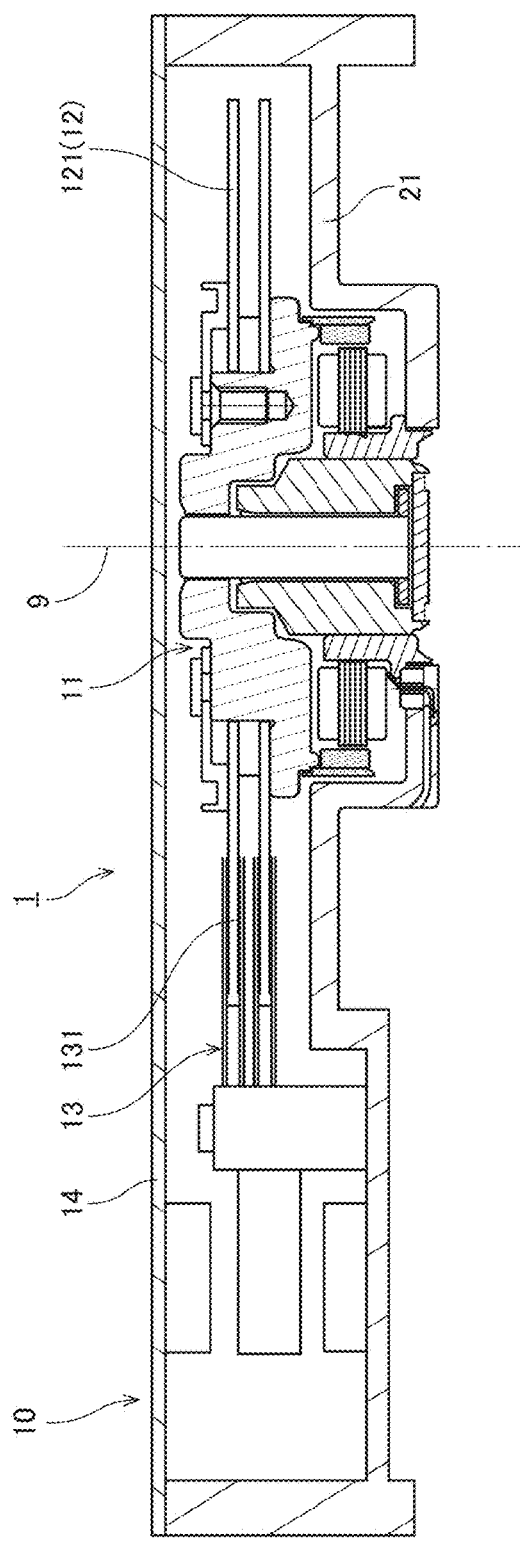
FIG. 2 is a vertical sectional view of a disk drive apparatus according to a second preferred embodiment of the present invention.

FIG. 2 is a vertical sectional view of a disk drive apparatus 1 according to a second preferred embodiment of the present invention. The disk drive apparatus 1 is an apparatus arranged to perform reading and writing of information from or to magnetic disks 121, each of which is an annular member 12 including a circular hole in a center thereof, while rotating the magnetic disks 121. Referring to FIG. 2, the disk drive apparatus 1 includes a motor 11, the magnetic disks 121, which are two in number, an access portion 13, and a cover 14, which defines a portion of a housing 10.

The motor 11 is arranged to rotate the magnetic disks 121 about a central axis 9 while supporting the magnetic disks 121. The motor 11 includes a base portion 21 arranged to extend radially below the magnetic disks 121. At least a portion of the motor 11, the magnetic disks 121, and the access portion 13 are accommodated in the housing 10, which is made up of the base portion 21 and the cover 14. The access portion 13 is arranged to move heads 131 along recording surfaces of the magnetic disks 121 to perform at least one of the reading and the writing of information from or to the magnetic disks 121. Note that the number of magnetic disks 121 included in the disk drive apparatus 1 may alternatively be one or more than two.

An interior space of the housing 10 is preferably a clean space with extremely little dirt or dust. According to the present preferred embodiment, the interior space of the housing 10 is filled with clean air. Note, however, that the interior space of the housing 10 may alternatively be filled with a helium gas, a hydrogen gas, or a nitrogen gas instead of air. Also note that the interior space of the housing 10 may alternatively be filled with a mixture of any of these gases and air.

2-2. Structure of Motor

Figure 3:
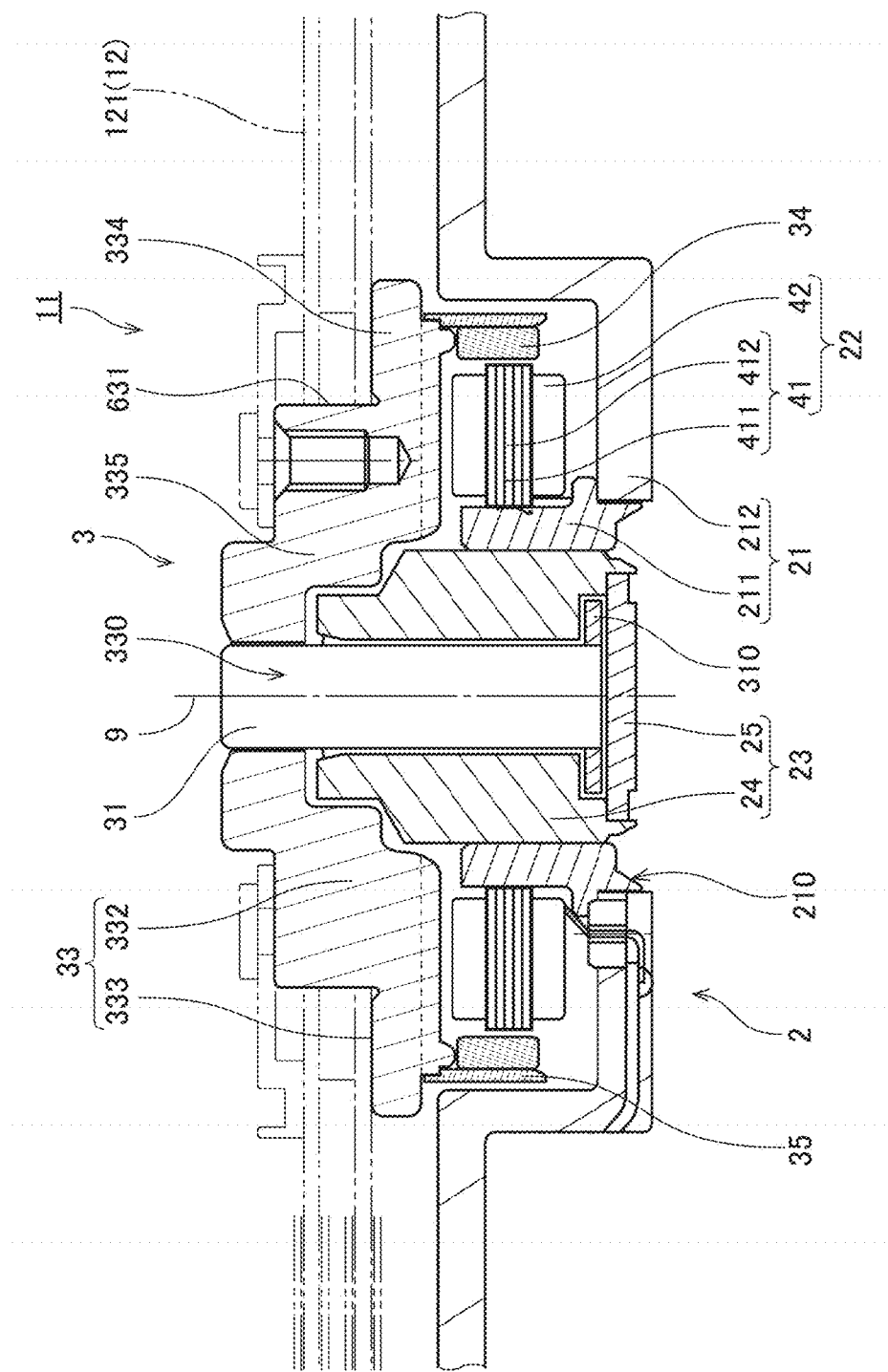
FIG. 3 is a vertical sectional view of a motor according to the second preferred embodiment.

Next, the structure of the aforementioned motor 11 will now be described below. FIG. 3 is a vertical sectional view of the motor 11 according to the second preferred embodiment. Referring to FIG. 3, the motor 11 includes a stationary portion 2 and a rotating portion 3. The stationary portion 2 is arranged to be stationary relative to the housing 10 of the disk drive apparatus 1. The rotating portion 3 is supported to be rotatable with respect to the stationary portion 2.

The stationary portion 2 according to the present preferred embodiment includes the base portion 21, a stator 22, and a bearing 23 arranged to rotatably support a shaft 31, which will be described below. The base portion 21 includes a stator holder 211 and a mounting plate 212.

The mounting plate 212 is a plate-shaped member arranged to support the stator holder 211. A metal, such as, for example, stainless steel, is used as a material of the mounting plate 212. The mounting plate 212 is arranged to extend radially outward from an outer circumference of the stator holder 211. In addition, the mounting plate 212 includes a circular through hole 210 in which a lower end portion of the stator holder 211 is fitted. When the motor 11 is used, the mounting plate 212 is fixed to a frame of a device through, for example, screwing. Note that a circuit board to supply electric drive currents to coils 42 of the stator 22, which will be described below, may be arranged on a surface of the mounting plate 212.

The stator holder 211 is a cylindrical member arranged to extend in the axial direction. The lower end portion of the stator holder 211 is inserted into the through hole 210 of the mounting plate 212, and is fixed to the mounting plate 212 by crimping. Note, however, that the stator holder 211 may alternatively be fixed to the mounting plate 212 by another method, such as, for example, welding. Also note that the mounting plate 212 and the stator holder 211 may alternatively be defined by a single continuous monolithic member.

The stator 22 is an armature including a stator core 41 and the coils 42. The stator core 41 is, for example, defined by laminated steel sheets, that is, electromagnetic steel sheets, such as, for example, silicon steel sheets, placed one upon another in the axial direction. The stator core 41 is fixed to an outer circumferential surface of the stator holder 211 through, for example, an adhesive. In addition, the stator core 41 includes a core back 411 in the shape of a circular ring, and a plurality of teeth 412 arranged to project radially outward from the core back 411. The coils 42 are a collection of conducting wires wound around the teeth 412. The teeth 412 and the coils 42 are arranged in an annular shape with the central axis 9 as a center.

The bearing 23 includes a sleeve 24 arranged to extend in the axial direction to assume a substantially cylindrical shape around the shaft 31, and a disk-shaped cap 25 arranged to close an opening at a lower end portion of the sleeve 24. A lower portion of the sleeve 24 is inserted into a space radially inside of the stator holder 211, and is fixed to the stator holder 211 through, for example, an adhesive. An upper end portion of the sleeve 24 is arranged axially above an upper end portion of the stator holder 211 and an upper end portion of the stator 22. An inner circumferential surface of the sleeve 24 is arranged radially opposite to an outer circumferential surface of the shaft 31.

The rotating portion 3 according to the present preferred embodiment includes a hub 33, a magnet 34, and a yoke 35. In addition, the rotating portion 3 includes the shaft 31, which is columnar and is arranged to extend in the axial direction along the central axis 9. Note that the shaft 31 may be defined integrally with the hub 33 or be defined by a member separate from the hub 33.

A metal, such as, for example, stainless steel, is used as a material of the shaft 31. The outer circumferential surface of the shaft 31 and the inner circumferential surface of the sleeve 24 are arranged radially opposite to each other with a slight gap therebetween. In addition, a disk-shaped shaft annular portion 310, which is arranged to extend radially outward from a lower end of the shaft 31, is fixed to a lower portion of the shaft 31. An upper surface of the shaft annular portion 310 and a lower surface of the sleeve 24 are arranged axially opposite to each other with a slight gap therebetween. In addition, a lower surface of the shaft annular portion 310 and an upper surface of the cap 25 are arranged axially opposite to each other with a slight gap therebetween. Note that the shaft 31 and the shaft annular portion 310 may alternatively be defined by a single monolithic member. The above gaps are arranged to be continuous with each other, and a lubricating fluid is continuously arranged in the gaps. The shaft 31 is supported to be rotatable with respect to the sleeve 24 and the cap 25 with the gaps including the lubricating fluid therebetween, and is arranged to rotate about the central axis 9 while the motor 11 is running. That is, in the present preferred embodiment, the bearing 23, which is a fluid dynamic bearing, is defined by the sleeve 24 and the cap 25, which belong to the stationary portion 2, the shaft 31, which belongs to the rotating portion 3, and the lubricating fluid arranged therebetween. A polyester oil or a diester lubricant, for example, is used as the lubricating fluid. An upper end portion of the shaft 31 is arranged to project upward above an upper surface of the sleeve 24. Note, however, that the motor 11 may alternatively be arranged to include a bearing of another type, such as, for example, a plain bearing or a ball bearing, instead of the fluid dynamic bearing.

The hub 33 is a member arranged to extend in an annular shape around the central axis 9. The hub 33 includes a hub annular portion 332 in the shape of a circular ring, and a flange surface 333. The hub annular portion 332 is arranged above the stator 22. The flange surface 333 is an upper surface of a flange portion 334, which has a relatively large thickness and is arranged to extend radially in a lower portion of the hub annular portion 332. The magnetic disks 121 are arranged on the flange surface 333. The hub annular portion 332 is fixed to the outer circumferential surface of the shaft 31, and is arranged to extend from an upper portion of the shaft 31 to assume an annular shape. A through hole 330 passing through the hub 33 in the axial direction is defined radially inside of the hub annular portion 332. The upper end portion of the shaft 31 is press fitted in the through hole 330.

Further, an adhesive (not shown) is arranged between an outer circumferential surface of the upper end portion of the shaft 31 and an inner circumferential surface of the hub annular portion 332. Thus, in this motor 11, the shaft 31 and the hub 33 are fixed to each other through press fitting and the adhesive. Note, however, that the shaft 31 and the hub 33 may alternatively be fixed to each other through only press fitting or through only the adhesive. Also note that the shaft 31 and the hub 33 may alternatively be fixed to each other by another method, such as, for example, shrink fitting.

In addition, the hub annular portion 332 includes a hub intermediate portion 335 above the flange portion 334, the hub intermediate portion 335 having a radial thickness smaller than that of the flange portion 334. An outer circumferential surface 631 of the hub intermediate portion 335 is fitted in the circular holes of the magnetic disks 121. At least a portion of an inner circumferential portion of each magnetic disk 121 is arranged to be in contact with the outer circumferential surface 631 of the hub intermediate portion 335. Each magnetic disk 121 is thus supported while being radially positioned. In addition, a lower surface of a lowermost one of the magnetic disks 121 is arranged to be in contact with at least a portion of the flange surface 333, which is in the shape of a circular ring. The magnetic disk 121 is thus supported while being axially positioned.

The magnet 34 is fixed to an inner circumferential surface of the yoke 35, which will be described below, through, for example, an adhesive. A permanent magnet in the shape of a circular ring is used as the magnet 34 according to the present preferred embodiment. The magnet 34 is cylindrical or substantially cylindrical, and is arranged radially outside of the stator 22. An inner circumferential surface of the magnet 34 includes north and south poles arranged to alternate with each other in a circumferential direction. In addition, the inner circumferential surface of the magnet 34 is arranged radially opposite to a radially outer end surface of each of the teeth 412 with a slight gap therebetween. That is, the magnet 34 includes a pole surface arranged radially opposite to the stator 22. Note that a plurality of magnets may be used in place of the magnet 34 in the shape of a circular ring. In the case where the plurality of magnets are used, the magnets are arranged on the inner circumferential surface of the yoke 35 such that pole surfaces of the north poles and pole surfaces of the south poles alternate with each other in the circumferential direction.

The structure of the yoke 35 will be described in detail below. A metal that is not a ferromagnetic material, such as, for example, an aluminum-based metal, is used as a material of the hub 33. A metal that is a ferromagnetic material, such as, for example, an iron-based metal, is used as a material of the yoke 35. Use of a ferromagnetic material as the material of the yoke 35 contributes to preventing magnetic flux generated from the magnet 34 from escaping outward.

Once electric drive currents are supplied to the coils 42 in the motor 11 described above, magnetic flux is generated around each of the teeth 412. In addition, a magnetic circuit passing through the stator 22, the magnet 34, and the yoke 35 is defined. Then, interaction between the magnetic flux of the teeth 412 and magnetic flux of the magnet 34 produces a circumferential torque between the stationary portion 2 and the rotating portion 3, so that the rotating portion 3 is caused to rotate about the central axis 9 with respect to the stationary portion 2. The magnetic disks 121 supported by the hub 33 are caused to rotate about the central axis 9 together with the rotating portion 3.

2-3. Structure of Yoke, and Fixing of Yoke to Hub

Next, the structure of the yoke 35 and fixing of the yoke 35 to the hub 33 will now be described below.

Figure 4:
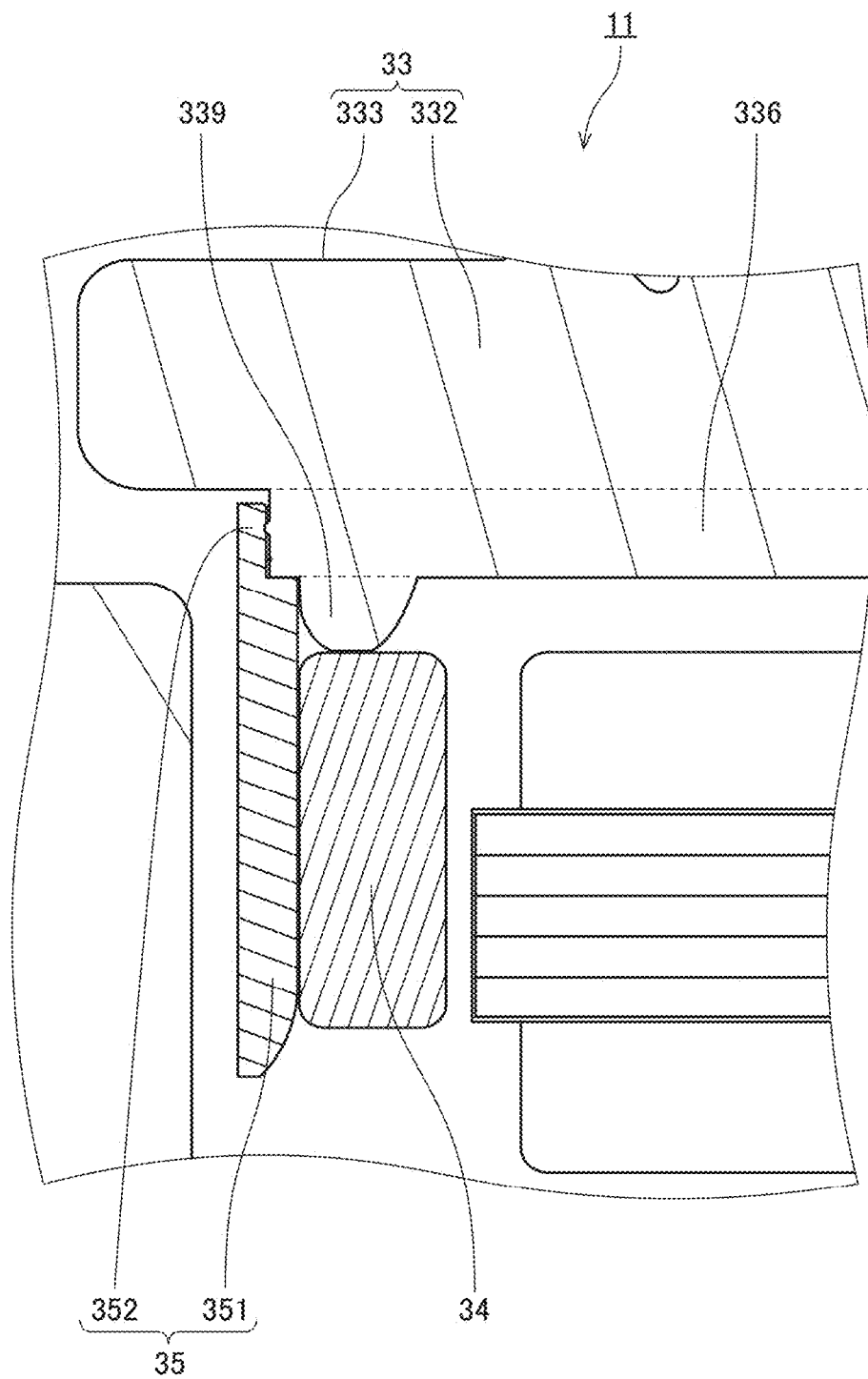
FIG. 4 is a partial vertical sectional view of the motor according to the second preferred embodiment.
Figure 5:
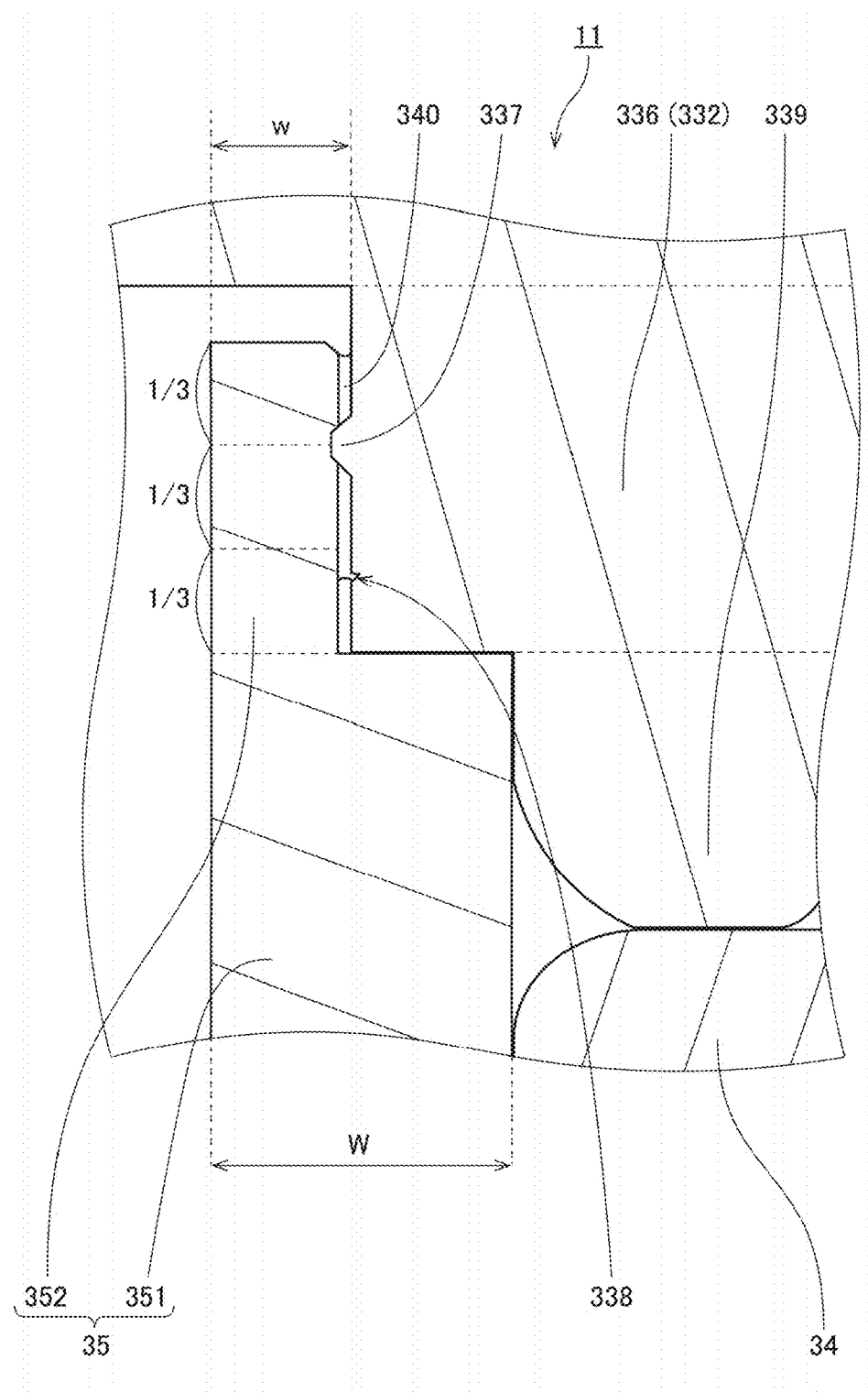
FIG. 5 is a partial vertical sectional view of the motor according to the second preferred embodiment.

Each of FIGS. 4 and 5 is a partial vertical sectional view of the motor 11. Referring to FIGS. 4 and 5, the yoke 35 according to the present preferred embodiment includes a yoke increased thickness portion 351, and a yoke decreased thickness portion 352 arranged to have a radial thickness smaller than that of the yoke increased thickness portion 351. The yoke increased thickness portion 351 is arranged to hold the magnet 34 on a radially inner side thereof. An inner circumferential surface of the yoke increased thickness portion 351 and an outer circumferential surface of the magnet 34 are fixed to each other through, for example, an adhesive. The yoke decreased thickness portion 352 is arranged axially above the yoke increased thickness portion 351.

The hub annular portion 332 includes a hub bottom plate portion 336 in a lower portion thereof, the hub bottom plate portion 336 having a radial width greater than that of the flange surface 333. An outer circumferential surface of the hub bottom plate portion 336 includes a hub projection portion 337 arranged to project radially outward. A portion of the yoke decreased thickness portion 352 is fixed to the hub projection portion 337, which is defined in the outer circumferential surface of the hub bottom plate portion 336, through press fitting at one axial position. That is, at this position, the hub projection portion 337 projects toward and thus presses the yoke decreased thickness portion 352 to fix the yoke decreased thickness portion 352. The likelihood that damage will occur when the yoke 35 is fitted to the hub 33 in a manufacturing process is lower in the case where the yoke decreased thickness portion 352 is fixed through press fitting with the projection defined in the hub 33 as described above than in the case where the yoke decreased thickness portion 352 is fixed through press fitting with a projection defined in the yoke 35. Note that the position at which the yoke 35 and the hub annular portion 332 are fixed to each other radially overlaps with the hub bottom plate portion 336, and is axially spaced from an upper end of the yoke increased thickness portion 351.

It is desirable that, in the outer circumferential surface of the hub bottom plate portion 336, the hub projection portion 337 be arranged to extend over the entire circumferential extent thereof. This contributes to securely fixing the yoke 35 to the hub annular portion 332, and preventing the yoke 35 from coming off the hub annular portion 332. Note, however, that hub projection portions 337 may alternatively be arranged at only some circumferential positions in the outer circumferential surface of the hub bottom plate portion 336.

Further, referring to FIG. 5, in the present preferred embodiment, the outer circumferential surface of the hub bottom plate portion 336 includes a recessed portion 338 recessed radially inward at a position at which the hub bottom plate portion 336 and the yoke decreased thickness portion 352 are radially opposite to each other. In addition, the motor 11 further includes an adhesive 340 arranged in the recessed portion 338 and at least a portion of a gap between the hub bottom plate portion 336 and the yoke decreased thickness portion 352. This contributes to more securely fixing the yoke 35 to the hub bottom plate portion 336, and preventing the yoke 35 from coming off the hub bottom plate portion 336.

In order to more securely fix the yoke 35 to the hub bottom plate portion 336, it is desirable that an upper surface of the adhesive 340 be defined at a position higher than the position at which the yoke decreased thickness portion 352 is fixed to the hub annular portion 332 through the hub projection portion 337.

In addition, it is desirable that a lower surface of the adhesive 340 be arranged to radially overlap with the recessed portion 338. This contributes to securely holding the adhesive 340 in the recessed portion 338 and at least a portion of the gap between the hub bottom plate portion 336 and the yoke decreased thickness portion 352. Note that the lower surface of the adhesive 340 may alternatively be defined at a position below the recessed portion 338. Also note that the lower surface of the adhesive 340 may alternatively be defined at a position below a hub projecting portion 339, which will be described below.

Thus, since the yoke decreased thickness portion 352, which has a relatively small radial thickness in the yoke 35, is fixed to a portion of the hub annular portion 332 which has a large radial thickness, deformation due to stress applied at the time of the fixing concentrates on the yoke 35, and does not easily affect the flange surface 333 of the hub 33. This contributes to minimizing deformation of the flange surface 333. This in turn leads to stable rotation of the disks 121. Moreover, the likelihood that an error in reading from any disk 121 will occur due to a deformation of the hub 33 is reduced.

Referring to FIG. 5, it is desirable that the yoke 35 and the hub annular portion 332 be fixed to each other at a position higher than a position that is lower than an upper end of the yoke decreased thickness portion 352 by two thirds of an axial dimension of the yoke decreased thickness portion 352. Arranging the yoke 35 to be press fitted to the hub annular portion 332 at a position higher than the position that is lower than the upper end of the yoke decreased thickness portion 352 by two thirds of the axial dimension of the yoke decreased thickness portion 352 makes it easier for the yoke decreased thickness portion 352 to be deformed. This contributes to more effectively preventing a stress applied when the yoke 35 is fixed to the hub annular portion 332 from affecting the flange surface 333, and minimizing the deformation of the flange surface 333. Analysis results illustrated in FIG. 6, which will be described below, show that deformation due to the stress applied at the time of the fixing concentrates on the yoke 35 to a greater degree, and affects the flange surface 333 of the hub 33 to a lesser degree, as the axial distance between the upper end of the yoke increased thickness portion 351 and the position at which the yoke decreased thickness portion 352 is press fitted and fixed to the hub annular portion 332 through the hub projection portion 337 increases with the thickness of the yoke decreased thickness portion 352 being the same (see analysis results of C and D in FIG. 6, where the above axial distance is greater in the case of D than in the case of C).

In addition, it is desirable that the position and size of each member be determined in advance such that an upper surface of the yoke increased thickness portion 351 is arranged to be in contact with a lower surface of the hub annular portion 332 as a result of the yoke 35 being fixed to the hub annular portion 332. Thus, the yoke 35 can be axially positioned easily using the lower surface of the hub annular portion 332 when the yoke 35 is fitted to the hub 33 in the manufacturing process.

The hub 33 according to the present preferred embodiment further includes the hub projecting portion 339, which is arranged to project downward from the lower surface of the hub annular portion 332. The position and size of the hub projecting portion 339 are determined such that an upper surface of the magnet 34 is arranged to be in contact with a lower surface of the hub projecting portion 339 as a result of the yoke 35 being fixed to the hub annular portion 332. Thus, the magnet 34, which is fixed to the inner circumferential surface of the yoke 35, can be axially positioned easily using the lower surface of the hub projecting portion 339 when the yoke 35 is fitted to the hub 33 in the manufacturing process. Note that, even in the case where the hub projecting portion 339 is provided, it is desirable that the yoke 35 be fixed to the hub annular portion 332 at a position higher than the lower surface of the hub annular portion 332, that is, higher than an upper end of the hub projecting portion 339, to cause stress applied when the yoke 35 is fixed to the hub 33 to concentrate on the yoke 35.

Figure 6:
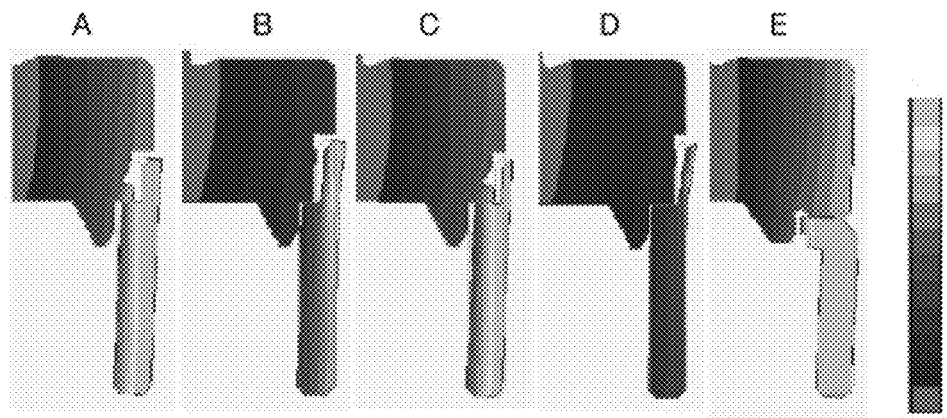
FIG. 6 is a diagram illustrating analysis results showing the relationship between the radial thickness of a yoke and the amount of displacement that occurs when the yoke is fixed to a hub according to the second preferred embodiment.
Figure 7:
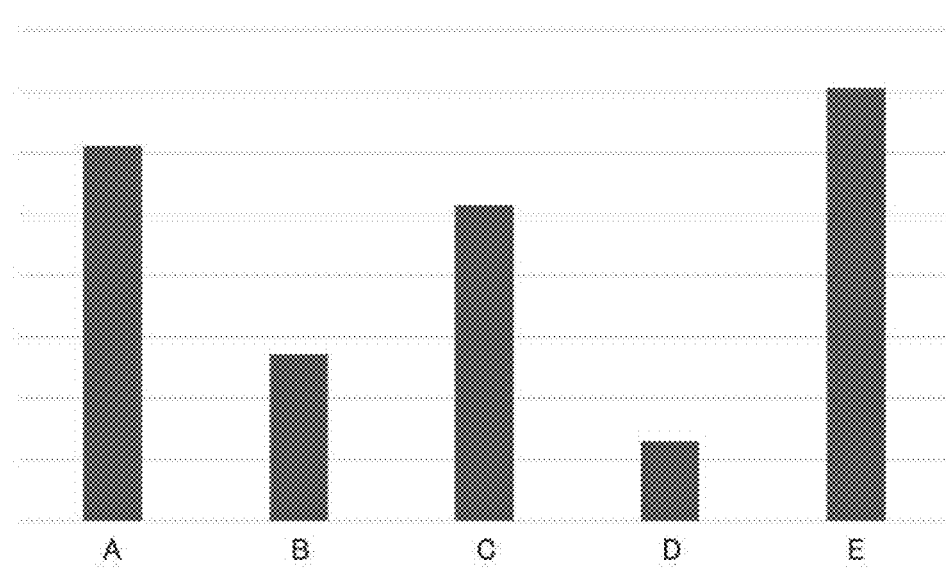
FIG. 7 is a diagram illustrating analysis results showing the relationship between the radial thickness of the yoke and the degree of inclination of a flange surface that occurs when the yoke is fixed to the hub according to the second preferred embodiment.

It is desirable that the yoke decreased thickness portion 352 be arranged to have a radial thickness equal to or smaller than a half of the radial thickness of the yoke increased thickness portion 351. FIG. 6 is a diagram illustrating analysis results showing the relationships between the ratio of the radial thickness of the yoke decreased thickness portion 352 to the radial thickness of the yoke increased thickness portion 351, the position of the hub projection portion 337, and the amount of displacement of the hub annular portion 332 that occurs when the yoke decreased thickness portion 352 is fixed to the hub annular portion 332. FIG. 7 is a diagram illustrating analysis results showing the relationships between the ratio of the radial thickness of the yoke decreased thickness portion 352 to the radial thickness of the yoke increased thickness portion 351, the position of the hub projection portion 337, and the degree of inclination of the flange surface 333 that occurs when the yoke decreased thickness portion 352 is fixed to the hub annular portion 333. In FIGS. 6 and 7, the ratio of the radial thickness of the yoke decreased thickness portion 352 to the radial thickness of the yoke increased thickness portion 351 is the same for A and B, and for C and D. Moreover, the ratio of the radial thickness of the yoke decreased thickness portion 352 to the radial thickness of the yoke increased thickness portion 351 in the cases of C and D is ½ or less, and a half of the ratio of the radial thickness of the yoke decreased thickness portion 352 to the radial thickness of the yoke increased thickness portion 351 in the cases of A and B. In addition, the axial distance between the upper end of the yoke increased thickness portion 351 and the position at which the yoke decreased thickness portion 352 is press fitted and fixed to the hub annular portion 332 through the hub projection portion 337 is the same for A and C, and for B and D. Moreover, this axial distance is greater in the cases of B and D than in the cases of A and C. Note that E represents an analysis result in the case where the upper surface of the yoke increased thickness portion 351 is fixed to the hub annular portion 332 without the yoke decreased thickness portion 352 being provided. Note that, in FIG. 6, different amounts of displacement are indicated by different shades of color. Note that, in FIG. 6, deformation of each member is exaggerated to illustrate the deformation more clearly.

FIGS. 6 and 7 show that, in the cases of C and D, where the ratio of the radial thickness of the yoke decreased thickness portion 352 to the radial thickness of the yoke increased thickness portion 351 is ½ or less, the amount of displacement of the hub annular portion 332 and the degree of inclination of the flange surface 333 that occur when the yoke decreased thickness portion 352 is fixed to the hub annular portion 332 are smaller than in the cases of A and B, where the above ratio is larger. That is, in the cases of C and D, the flange surface 333 is less easily affected by a stress, and a reduction in the deformation of the flange surface 333 can be achieved.

Further, FIGS. 6 and 7 show that, in the cases of B and D, where the axial distance between the upper end of the yoke increased thickness portion 351 and the position at which the yoke decreased thickness portion 352 is press fitted and fixed to the hub annular portion 332 through the hub projection portion 337 is greater, the amount of displacement of the hub annular portion 332 and the degree of inclination of the flange surface 333 that occur at the time of the fixing are smaller than in the cases of A and C, where the above axial distance is smaller. That is, in the cases of B and D, the flange surface 333 is less easily affected by a stress, and a reduction in the deformation of the flange surface 333 can be achieved.

It accordingly follows that, in the case of D, where the ratio of the radial thickness of the yoke decreased thickness portion 352 to the radial thickness of the yoke increased thickness portion 351 is ½ or less and the axial distance between the upper end of the yoke increased thickness portion 351 and the position at which the yoke decreased thickness portion 352 is press fitted and fixed to the hub annular portion 332 through the hub projection portion 337 is relatively large, the amount of displacement of the hub annular portion 332 and the degree of inclination of the flange surface 333 that occur at the time of the fixing are the smallest. That is, in the case of D, the flange surface 333 is least easily affected by a stress, and the greatest reduction in the deformation of the flange surface 333 can be achieved.

Notice that it can be seen that, in the case of E, where the upper surface of the yoke increased thickness portion 351 is fixed to the hub annular portion 332 without the yoke decreased thickness portion 352 being provided, a deformation of the hub 33 due to a stress applied at the time of the fixing occurs more easily, and more easily affects the flange surface 333 of the hub 33, than in the cases of A to D.

3. Example Modifications

While preferred embodiments of the present invention have been described above, it will be understood that the present invention is not limited to the above-described preferred embodiments.

Figure 8:
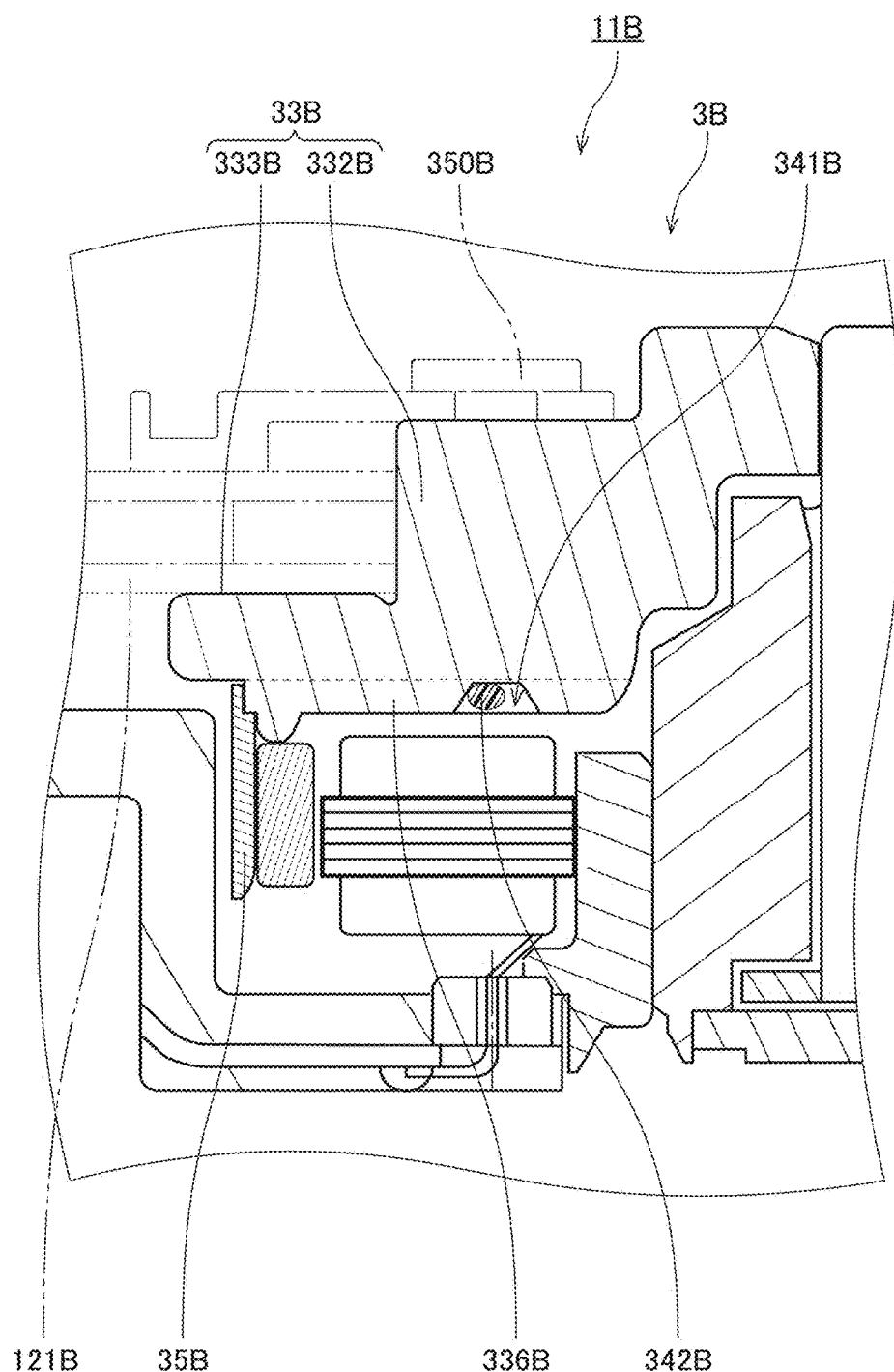
FIG. 8 is a partial vertical sectional view of a motor according to a modification of the second preferred embodiment.

FIG. 8 is a partial vertical sectional view of a motor 11B according to a modification of the second preferred embodiment. In the modification illustrated in FIG. 8, a hub bottom plate portion 336B includes a groove portion 341B recessed upward from at least a portion of a lower surface thereof. The motor 11B may further include a balance correction member 342B having a sufficient mass to perform a function of correcting balance of a rotating portion 3B in at least a portion of an interior of the groove portion 341B. This makes it possible to correct balance of the motor 11B after a yoke 35B is fitted to a hub 33B in a manufacturing process, to achieve more stable rotation of the motor 11B. Note that a plurality of groove portions 341B may be provided.

Note that it is desirable that the groove portion(s) 341B be arranged to have a total radial width equal to or smaller than a half of a radial width of the hub bottom plate portion 336B. Thus, even when the groove portion(s) 341B are provided, a stress applied when the yoke 35B is fixed to the hub 33B does not easily affect the hub 33B, and a reduction in deformation of a flange surface 333B can be achieved.

Further, a through hole (not shown) arranged to extend upward from the lower surface of the hub bottom plate portion 336B through a hub annular portion 332B may be provided in place of or in addition to the groove portion(s) 341B. This through hole may be used as a screw hole for a screw used to fix a clamp 350B arranged to hold disks 121B supported by the flange surface 333B.

Figure 9:
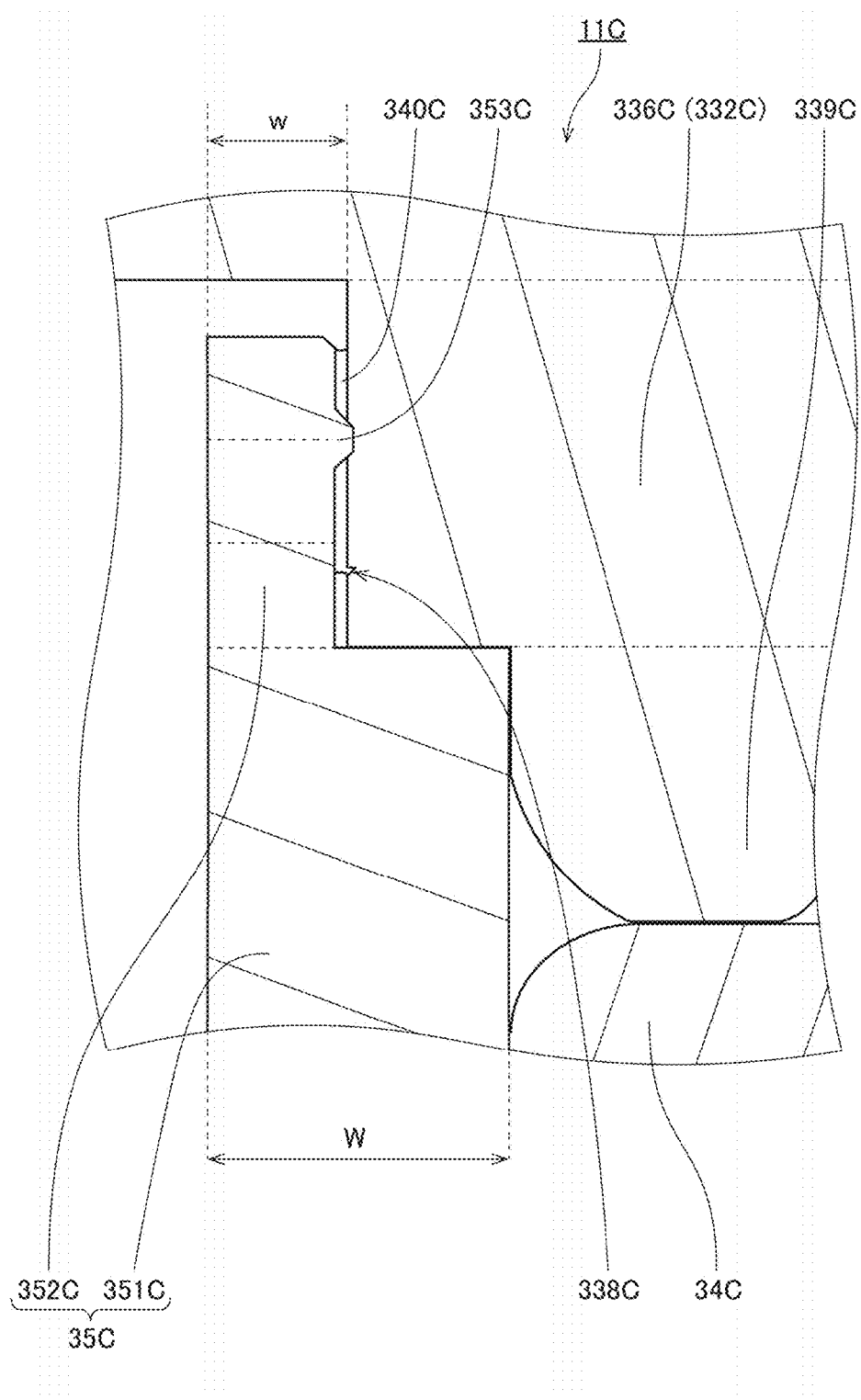
FIG. 9 is a partial vertical sectional view of a motor according to a modification of the second preferred embodiment.

FIG. 9 is a partial vertical sectional view of a motor 11C according to another modification of the second preferred embodiment. In the modification illustrated in FIG. 9, a yoke projection portion 353C arranged to project radially inward is defined in an inner circumferential surface of a yoke decreased thickness portion 352C. The yoke decreased thickness portion 352C may be press fitted and fixed to an outer circumferential surface of a hub bottom plate portion 336C through the yoke projection portion 353C.

Further, in the modification illustrated in FIG. 9, the outer circumferential surface of the hub bottom plate portion 336C includes a recessed portion 338C recessed radially inward at a position at which the hub bottom plate portion 336C and the yoke decreased thickness portion 352C are radially opposite to each other. In addition, the motor 11C further includes an adhesive 340C arranged in the recessed portion 338C and at least a portion of a gap between the hub bottom plate portion 336C and the yoke decreased thickness portion 352C. This contributes to more securely fixing a yoke 35C to a hub annular portion 332C, and preventing the yoke 35C from coming off the hub annular portion 332C. In addition, when the recessed portion 338C is provided, the adhesive 340C can be securely held in the recessed portion 338C.

Note that a lower surface of the adhesive 340C may be defined at a position below a hub projecting portion 339C, and the adhesive 340C may reach at least a portion of a gap between the hub projecting portion 339C, a yoke increased thickness portion 351C, and a magnet 34C. This contributes to more securely fixing the yoke 35C to the hub bottom plate portion 336C, and preventing the yoke 35C from coming off the hub bottom plate portion 336C.

Figure 10:
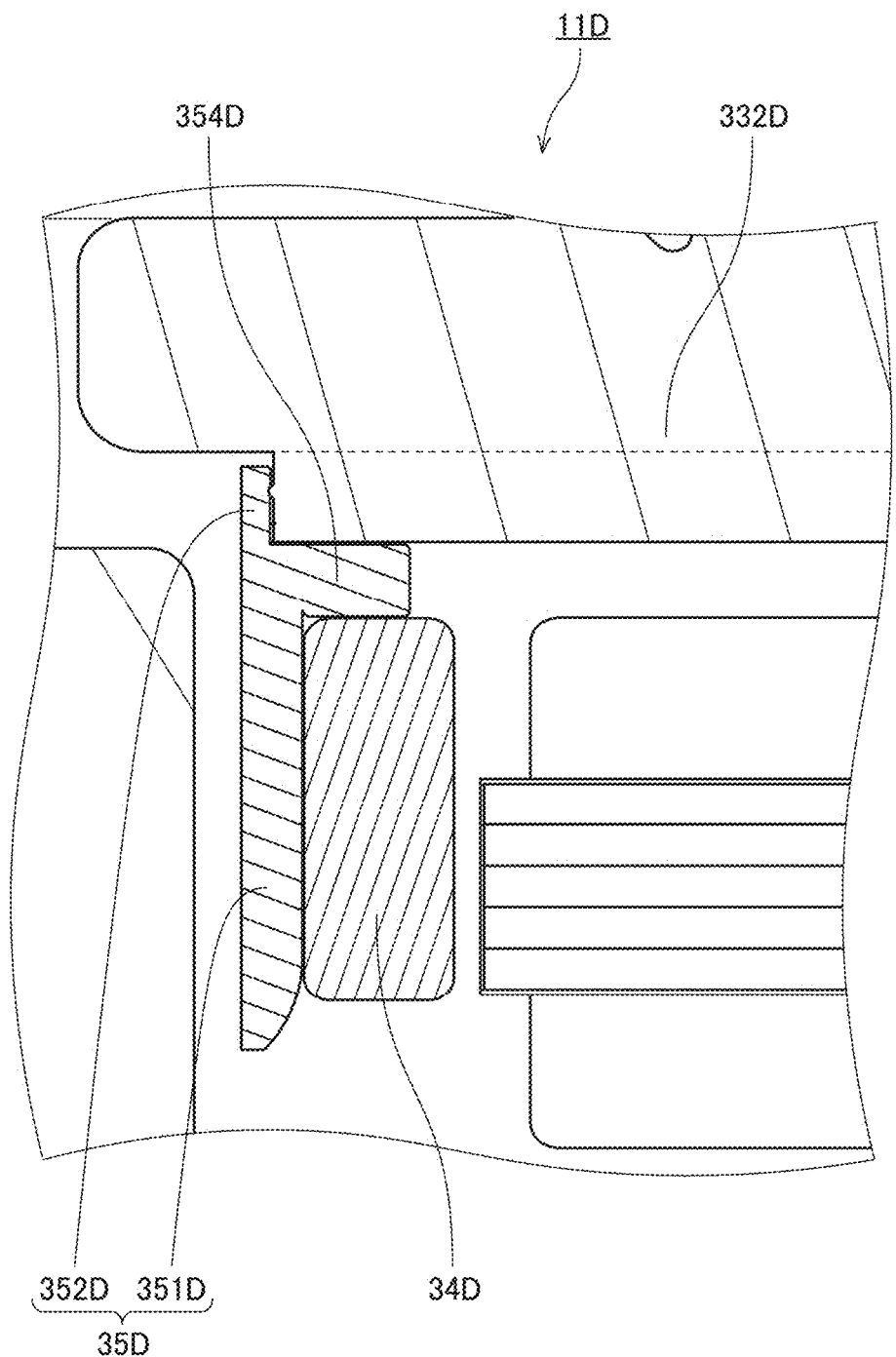
FIG. 10 is a partial vertical sectional view of a motor according to a modification of the second preferred embodiment.

FIG. 10 is a partial vertical sectional view of a motor 11D according to yet another modification of the second preferred embodiment. Referring to FIG. 10, a yoke 35D may include a yoke projecting portion 354D arranged to project radially inward from an upper portion of a yoke increased thickness portion 351D. An upper surface of the yoke projecting portion 354D is arranged to be in contact with a lower surface of a hub annular portion 332D. Thus, a yoke decreased thickness portion 352D can be axially positioned using the lower surface of the hub annular portion 332D. In addition, a lower surface of the yoke projecting portion 354D is arranged to be in contact with an upper surface of a magnet 34D. Thus, the magnet 34D can be axially positioned using the lower surface of the yoke projecting portion 354D when the magnet 34D is fixed to an inner circumferential surface of the yoke 35D.

Note that an annular member according to a preferred embodiment of the present invention may include an impeller or a flywheel instead of a disk, and that a motor according to a preferred embodiment of the present invention may be used as a fan motor to supply an air current.

Note that details of the structure and the shape of a motor according to a preferred embodiment of the present invention may differ from details of the structure and the shape of each motor as illustrated in the accompanying drawings of the present application. Also note that features of the above-described preferred embodiments and the modifications thereof may be combined appropriately as long as no conflict arises.

Preferred embodiments of the present invention are applicable to, for example, motors and disk drive apparatuses.

Features of the above-described preferred embodiments and the modifications thereof may be combined appropriately as long as no conflict arises.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor arranged to rotate an annular member, the motor comprising:
   a stationary portion including a stator; and
   a rotating portion arranged to be rotatable about a central axis extending in an axial direction; wherein
   the rotating portion includes:
      a hub arranged to extend in an annular shape around the central axis;
      a magnet including a pole surface arranged radially opposite to the stator; and
      a yoke to which the magnet is fixed;
   the hub includes:
      a hub annular portion in a shape of a circular ring and arranged above the stator; and
      a flange surface on which the annular member is arranged;
   the yoke includes:
      a yoke increased thickness portion arranged radially outside of the magnet, the yoke increased thickness portion extending continuously from a radially innermost surface of the yoke to a radially outermost surface of the yoke; and
      a yoke decreased thickness portion arranged to have a total radial thickness smaller than a total radial thickness of the yoke increased thickness portion, and arranged axially above the yoke increased thickness portion, the yoke decreased thickness portion extending continuously from the radially innermost surface of the yoke to the radially outermost surface of the yoke; and
   the yoke decreased thickness portion is fixed to the hub annular portion through press fitting.

2. The motor according to claim 1, wherein a position at which the yoke and the hub annular portion are fixed to each other is axially spaced from an upper end of the yoke increased thickness portion.

3. The motor according to claim 1, wherein a portion of the yoke decreased thickness portion is fixed to the hub annular portion through press fitting at one axial position.

4. The motor according to claim 1, wherein the yoke and the hub annular portion are fixed to each other at an axial position which is axially higher than an axial position which is axially below an upper end of the yoke decreased thickness portion by two thirds of a total axial dimension of the yoke decreased thickness portion.

5. The motor according to claim 1, wherein an upper surface of the yoke increased thickness portion is arranged to be in contact with a lower surface of the hub annular portion.

6. The motor according to claim 1, wherein the radial thickness of the yoke decreased thickness portion is arranged to be equal to or smaller than a half of the radial thickness of the yoke increased thickness portion.

7. The motor according to claim 1, wherein
the hub annular portion includes a hub bottom plate portion arranged to have a radial width greater than that of the flange surface; and
a position at which the yoke and the hub annular portion are fixed to each other is arranged to radially overlap with the hub bottom plate portion.

8. The motor according to claim 7, wherein
the hub bottom plate portion includes at least one groove portion recessed upward from a lower surface of the hub bottom plate portion; and
the at least one groove portion is arranged to have a total radial width equal to or smaller than a half of the radial width of the hub bottom plate portion.

9. The motor according to claim 1, wherein
the hub annular portion includes a hub projecting portion arranged to project downward from a lower surface of the hub annular portion;
the yoke and the hub annular portion are fixed to each other at a position higher than the lower surface of the hub annular portion; and
an upper surface of the magnet is arranged to be in contact with a lower surface of the hub projecting portion.

10. The motor according to claim 1, wherein
the yoke includes a yoke projecting portion arranged to project radially inward from an upper portion of the yoke increased thickness portion;
an upper surface of the yoke projecting portion is arranged to be in contact with a lower surface of the hub annular portion; and
a lower surface of the yoke projecting portion is arranged to be in contact with an upper surface of the magnet.

11. The motor according to claim 1, wherein the hub annular portion includes a hub projection portion arranged to project toward the yoke at a position at which the yoke and the hub annular portion are fixed to each other.

12. The motor according to claim 11, wherein the hub projection portion is arranged to extend over an entire circumferential extent of the hub annular portion.

13. The motor according to claim 1, wherein
the hub annular portion includes a recessed portion recessed radially inward at a position at which the hub annular portion and the yoke decreased thickness portion are radially opposite to each other; and
the motor further comprises an adhesive arranged in at least a portion of a gap between the hub annular portion and the yoke decreased thickness portion, the at least a portion of the gap including the recessed portion.

14. The motor according to claim 13, wherein an upper surface of the adhesive is defined at a position higher than a position at which the yoke and the hub annular portion are fixed to each other.

15. The motor according to claim 13, wherein a lower surface of the adhesive is arranged to radially overlap with the recessed portion.

16. The motor according to claim 1, wherein the hub is made of an aluminum-based metal, and the yoke is made of an iron-based metal.

17. A disk drive apparatus comprising:
the motor of claim 1;
an access portion arranged to perform at least one of reading and writing of information from or to a disk supported by the flange surface of the motor, the disk being the annular member; and
a housing arranged to accommodate at least a portion of the motor and the access portion.

* * * * *